(12) United States Patent
Zhuang et al.

(10) Patent No.: US 8,712,332 B2
(45) Date of Patent: Apr. 29, 2014

(54) CAPACITY AND COVERAGE SELF-OPTIMIZATION METHOD AND DEVICE IN A MOBILE NETWORK

(75) Inventors: Hongcheng Zhuang, Shenzhen (CN); Jietao Zhang, Shenzhen (CN); Zezhou Luo, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 63 days.

(21) Appl. No.: 13/593,151

(22) Filed: Aug. 23, 2012

(65) Prior Publication Data

US 2013/0023217 A1   Jan. 24, 2013

Related U.S. Application Data

(63) Continuation of application No. PCT/CN2011/077441, filed on Jul. 21, 2011.

(51) Int. Cl.
*H04B 1/00* (2006.01)
*H04B 15/00* (2006.01)
*H04W 40/00* (2009.01)

(52) U.S. Cl.
USPC .......................................... 455/63.1; 455/446

(58) Field of Classification Search
USPC ............. 455/63.1, 423, 33, 34, 54, 62, 67.11, 455/524, 456, 457, 446, 448, 449, 405
See application file for complete search history.

(56) References Cited

U.S. PATENT DOCUMENTS 5,953,661 A * 9/1999 Schwinghammer et al. . 455/423

FOREIGN PATENT DOCUMENTS

| CN | 101247624 A | 8/2008 |
|---|---|---|
| CN | 101316433 A | 12/2008 |
| CN | 101404800 A | 4/2009 |

OTHER PUBLICATIONS

International search report and written opinion for International application No. PCT/CN2011/077441, dated Apr. 26, 2012, total 9 pages.
D'Amico, V. et al., "EU FP7 INFSO-ICT-247223, ARTIST4G, D1.2 Innovative advanced signal processing algorithms for interference avoidance," Dec. 31, 2010, XP055095668, total 111 pages.
Botella, C. et al., "EU FP7 INFSO—ICT—247223 ARTIST4G. D1.3 Innovative scheduling and cross-layer design techniques for interference avoidance," Mar. 31, 2011, XP055095669, total 96 pages.
Novlan, T. et al., "Comparison of Fractional Frequency Reuse Approaches in the OFDMA Cellular Downlink," Dec. 6, 2010, XP031846484, total 5 pages.

(Continued)

*Primary Examiner* — Eugene Yun
(74) *Attorney, Agent, or Firm* — Huawei Technologies Co., Ltd.

(57) ABSTRACT

The present invention discloses an adaptive cell coverage and capacity optimization method and device in a mobile communication network, aiming to improve adaptive optimization performance of cell capacity and coverage. The technical solutions includes: calculating spectral efficiency of a cell; if the spectral efficiency of the cell is less than a first threshold, starting vertical sectorization processing of the cell to divide the cell into an inner sector and an outer sector, and configuring relevant parameters of the inner sector and the outer sector to improve the spectral efficiency of the cell; calculating spectral efficiency of the outer sector; and if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell.

12 Claims, 6 Drawing Sheets

(56) References Cited

OTHER PUBLICATIONS

D'Amico, V. et al., "Advanced interference management in ARTIST4G: interference avoidance," Sep. 27, 2010, XP031784714, total 4 pages.

Huawei et al., "Some Clarifications on Soft Frequency Reuse Scheme," Jan. 19, 2006, XP050417557, total 3 pages.

Saur, S. et al., "Exploring the vertical dimension of dynamic beam steering," May 3, 2011, XP031947916, total 5 pages.

* cited by examiner

CAPACITY AND COVERAGE SELF-OPTIMIZATION METHOD AND DEVICE IN A MOBILE NETWORK

CROSS-REFERENCE TO RELATED APPLICATIONS

This application is a continuation of International Application No. PCT/CN2011/077441, filed on Jul. 21, 2011, which is hereby incorporated by reference in their entireties.

FIELD OF THE INVENTION

The present invention relates to the field of communications, and in particular, to a cell coverage and capacity self-optimization device and method in a mobile communication network.

BACKGROUND OF THE INVENTION

With continuous expansion of a mobile communication network size, and continuous miniaturization of base stations, the number of network elements that an operator needs to maintain increases rapidly, and maintenance cost also grows gradually. In order to save operating cost, the NGMN organization led by the TMO and the VDF proposed the concept of self-organization network (self-organization network, SON) in December, 2006. The meaning of the SON is to implement automation as much as possible during planning, deployment, and operating and maintenance stages of a mobile communication network. For the convenience of problem study and standardized work, the 3GPP defines a series of use cases (use case) for SON standardization starting from Release 8, and discusses a corresponding solution for each use case. The use case of coverage and capacity optimization (Coverage and Capacity Optimization, CCO) is a major problem of a cellular network.

A factor that influences system coverage and capacity is parameters of a base station antenna (for example, a downtilt and power of the antenna). Changing the downtilt and power of the antenna is a major means of network optimization, while adaptively changing the downtilt and power is a focus of the SON. Interference is another major factor that influences coverage and capacity. In an OFDMA-based system, due to orthogonality of internal resources of a cell, the interference is mainly inter-cell interference. An inter-cell interference coordination (Inter-Cell Interference Coordination, ICIC) technology reduces interference on a cell edge from a neighbor cell through orthogonality of bandwidth used by an edge of the neighbor cell, thereby improving spectral efficiency of the cell edge, and cell coverage. However, bandwidth division decreases reuse of a frequency band, thereby reducing spectral efficiency of the entire cell, that is, the capacity of the cell. Therefore, it is a compromise problem between coverage and capacity. To achieve desirable compromise between the coverage and capacity, in a dynamic ICIC method, ICIC parameters (for example, an overload indication threshold) are adjusted to adapt to distribution of users.

Dynamic fractional frequency reuse (Fractional Frequency Reuse, FFR) and soft frequency reuse (Soft Frequency Reuse, SFR) are two major dynamic ICIC technologies for improving coverage performance by reducing inter-cell interference at present. However, since frequency bands at cell edges are required to be orthogonal, the system capacity is reduced and the spectral efficiency is decreased. Therefore, neither FFR nor SFR can solve the compromise problem between the system capacity and coverage.

In order to further improve performance of cell edge users, based on the FFR/SFR, the cell edge users are further divided into cell center users and cell remote users in the prior art. For the cell remote users, due to the increase of the reuse distance, interference between each other is reduced, and coverage performance is improved. Further division of the cell edge users reduces bandwidth available to the cell center users, and further reduces reuse of the system bandwidth, thereby reducing the system capacity. To achieve optimization of the capacity and coverage at the same time is still a problem to be solved at present.

SUMMARY OF THE INVENTION

Embodiments of the present invention provide a method and a device capable of adaptively optimizing cell coverage and capacity in a mobile communication network.

An embodiment of the present invention provides a cell capacity and coverage self-optimization method, including: calculating spectral efficiency of a cell; if the spectral efficiency of the cell is less than a first threshold, starting vertical sectorization processing of the cell to divide the cell into an inner sector and an outer sector, and configuring relevant parameters of the inner sector and the outer sector to improve the spectral efficiency of the cell; calculating spectral efficiency of the outer sector; and if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell.

An embodiment of the present invention provides a cell capacity and coverage self-optimization device, including: a spectral efficiency calculation unit, configured to calculate spectral efficiency of a cell; a vertical sectorization execution unit, configured to start vertical sectorization processing to divide the cell into an inner sector and an outer sector, and configure relevant parameters of the inner sector and the outer sector to improve the spectral efficiency of the cell, where the spectral efficiency calculation unit is further configured to calculate spectral efficiency of the outer sector; the device further includes: an inter-cell interference coordination unit, configured to start inter-cell interference coordination to improve the spectral efficiency of the outer sector; and a joint optimization unit, configured to invoke the spectral efficiency calculation unit to calculate the spectral efficiency of the cell, when the spectral efficiency of the cell is less than a first threshold, invoke the vertical sectorization execution unit to divide the cell into an inner sector and an outer sector and configure relevant parameters of the inner sector and the outer sector to improve the spectral efficiency of the cell, and when the spectral efficiency of the outer sector is less than a second threshold, invoke the inter-cell interference coordination unit to start inter-cell interference coordination to improve the spectral efficiency of the outer sector, and reconfigure the relevant parameters of the inner sector and the outer sector to improve the spectral efficiency of the cell.

An embodiment of the present invention provides a management system with a cell capacity and coverage self-optimization function. The management system includes at least one base station, where the base station includes: a spectral efficiency calculation unit, configured to calculate spectral efficiency of a cell corresponding to the base station; a vertical sectorization execution unit, configured to start vertical sectorization processing to divide the cell corresponding to the base station into an inner sector and an outer sector, and configure relevant parameters of the inner sector and the outer sector to improve the spectral efficiency of the cell corresponding to the base station, where the spectral efficiency calculation unit is further configured to calculate spectral efficiency of the outer sector; and an inter-cell interference coordination unit, configured to start inter-cell interference coordination to improve the spectral efficiency of the outer sector. The management system further includes a centralized controller, where the centralized controller is configured to invoke the spectral efficiency calculation unit of each base station controlled by the centralized controller to calculate spectral efficiency of a cell corresponding to each base station, if spectral efficiency of a cell corresponding to a base station is less than a first threshold, invoke the vertical sectorization execution unit of the base station to divide the cell corresponding to the base station into an inner sector and an outer sector and configure relevant parameters of the inner sector and the outer sector to improve the spectral efficiency of the cell corresponding to the base station, and when spectral efficiency of the outer sector is less than a second threshold, invoke, according to information of interaction with the base stations controlled by the centralized controller, the inter-cell interference coordination unit of the base station to start inter-cell interference coordination to improve the spectral efficiency of the outer sector, and reconfigure the relevant parameters of the inner sector and the outer sector to improve the spectral efficiency of the cell corresponding to the base station.

An embodiment of the present invention provides a management system with a cell capacity and coverage self-optimization function. The management system includes at least one base station, where the base station includes: a spectral efficiency calculation unit, configured to calculate spectral efficiency of a cell corresponding to the base station; a vertical sectorization execution unit, configured to start vertical sectorization processing to divide the cell corresponding to the base station into an inner sector and an outer sector and configure relevant parameters of the inner sector and the outer sector to improve the spectral efficiency of the cell corresponding to the base station, where the spectral efficiency calculation unit is further configured to calculate spectral efficiency of the outer sector; an inter-cell interference coordination unit, configured to start inter-cell interference coordination of the cell corresponding to the base station to improve the spectral efficiency of the outer sector; and a joint optimization unit, configured to invoke the spectral efficiency calculation unit to calculate spectral efficiency of a cell corresponding to the base station, when the spectral efficiency of the cell corresponding to the base station is less than a first threshold, invoke the vertical sectorization execution unit to divide the cell corresponding to the base station into an inner sector and an outer sector, and configure relevant parameters of the inner sector and the outer sector to improve the spectral efficiency of the cell corresponding to the base station, and when spectral efficiency of the outer sector is less than a second threshold, invoke, according to information of interaction with other neighbor base stations, the inter-cell interference coordination unit of the base station to start inter-cell interference coordination to improve the spectral efficiency of the outer sector, and reconfigure the relevant parameters of the inner sector and the outer sector to improve the spectral efficiency of the cell corresponding to the base station.

An embodiment of the present invention provides a management system with a cell capacity and coverage self-optimization function. The management system includes at least one base station, where the base station includes: a vertical sectorization execution unit, configured to start vertical sectorization processing to divide a cell corresponding to the base station into an inner sector and an outer sector, and configure relevant parameters of the inner sector and the outer sector to improve spectral efficiency of the cell corresponding to the base station; and an inter-cell interference coordination unit, configured to start inter-cell interference coordination to improve spectral efficiency of the outer sector. The management system further includes a centralized controller, where the centralized controller includes: a spectral efficiency calculation unit, configured to calculate spectral efficiency of a cell or an outer sector corresponding to each base station managed by the centralized controller; and a joint optimization unit, configured to invoke the spectral efficiency calculation unit to calculate the spectral efficiency of the cell corresponding to each base station managed by the centralized controller, if spectral efficiency of a cell corresponding to a base station is less than a first threshold, invoke the vertical sectorization execution unit of the base station to divide the cell into an inner sector and an outer sector and configure relevant parameters of the inner sector and the outer sector to improve the spectral efficiency of the cell, and when spectral efficiency of the outer sector corresponding to the base station is less than a second threshold, invoke, according to information of interaction with the base stations, the inter-cell interference coordination unit of the base station to start inter-cell interference coordination to improve the spectral efficiency of the outer sector corresponding to the base station, and reconfigure the relevant parameters of the inner sector and the outer sector to improve the spectral efficiency of the cell corresponding to the base station.

The embodiments of the present invention adopt an inter-cell interference coordination technology to reduce inter-cell interference, so as to improve spectral efficiency of a cell edge, thereby increasing the cell coverage. Based on this, a vertical sectorization technology is introduced to improve reuse of system bandwidth and improve spectral efficiency of a cell, so as to increase cell capacity, thereby optimizing capacity and coverage performance of a system at the same time. Compared with the prior art, the embodiments of the present invention effectively combine the inter-cell interference coordination and vertical sectorization technologies, and overcome the disadvantage that it is difficult to achieve optimal capacity and coverage at the same time in the prior art, thereby better implementing adaptive optimization of the cell coverage and capacity.

BRIEF DESCRIPTION OF THE DRAWINGS

To illustrate the technical solutions according to the embodiments of the present invention or in the prior art more clearly, the accompanying drawings for describing the embodiments or the prior art are given briefly below. Apparently, the accompanying drawings in the following description are only about some embodiments of the present invention, and persons of ordinary skill in the art can derive other drawings from the accompanying drawings without creative efforts.

DETAILED DESCRIPTION OF THE EMBODIMENTS

The present invention is further described in detail in the following with reference to the accompanying drawings and specific implementation manners.

An embodiment of the present invention provides a cell coverage and capacity self-optimization method in a mobile communication network. The adaptive optimization method includes: calculating spectral efficiency of a cell; if the spectral efficiency of the cell is less than a first threshold, starting vertical sectorization processing of the cell to divide the cell into an inner sector and an outer sector, and configuring relevant parameters of the inner sector and the outer sector to improve the spectral efficiency of the cell; calculating spectral efficiency of the outer sector; and if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell.

Figure 1:
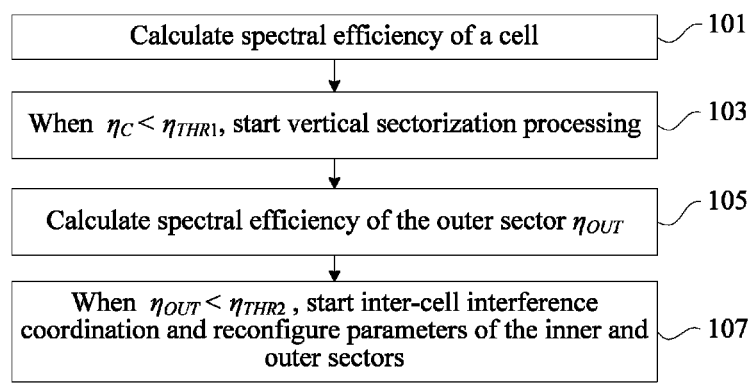
FIG. 1 is a flow chart of an embodiment of a cell coverage and capacity self-optimization method in the present invention.

Referring to FIG. 1, FIG. 1 is an embodiment of a cell coverage and capacity self-optimization method, and the method of this embodiment includes the following steps.

S101: Calculate spectral efficiency of a cell $\eta_C$,

In specific implementation, the spectral efficiency of the cell is calculated through an adaptive method and according to distribution of services and terminals.

If the spectral efficiency of the cell $\eta_C$ is not equal to 0 and is less than a first threshold $\eta_{THR1}$, S103: start vertical sectorization processing of the cell to divide the cell into an inner sector and an outer sector, and configure relevant parameters of the inner sector and the outer sector to improve the spectral efficiency of the cell.

S105: Calculate spectral efficiency of the outer sector $\eta_{OUT}$,

In specific implementation, the spectral efficiency of the outer sector is calculated by making statistics of distribution of outer sector users and services and a level of interference imposed on a current cell.

S107: If the spectral efficiency of the outer sector $\eta_{OUT}$ is not equal to 0 and is less than a second threshold $\eta_{THR2}$, start inter-cell interference coordination to improve the spectral efficiency of the outer sector, and reconfigure the relevant parameters of the inner sector and the outer sector to improve the spectral efficiency of the cell.

In a specific embodiment, in the self-optimization method, based on a certain time cycle, the distribution of users and services of the current cell is detected and the spectral efficiency of the cell is calculated, to adjust parameters of the vertical sectorization and interference coordination functions. In specific implementation, the time cycle adopted is 30 minutes. In an exemplary implementation manner of the present invention, the first threshold is 5 bps/Hz, and the second threshold is 0.8 bps/Hz. However, the thresholds are not limited to the specific values. The first threshold and the second threshold are determined according to network parameters used for estimating network performance, and may have different values in different network applications.

Figure 2:
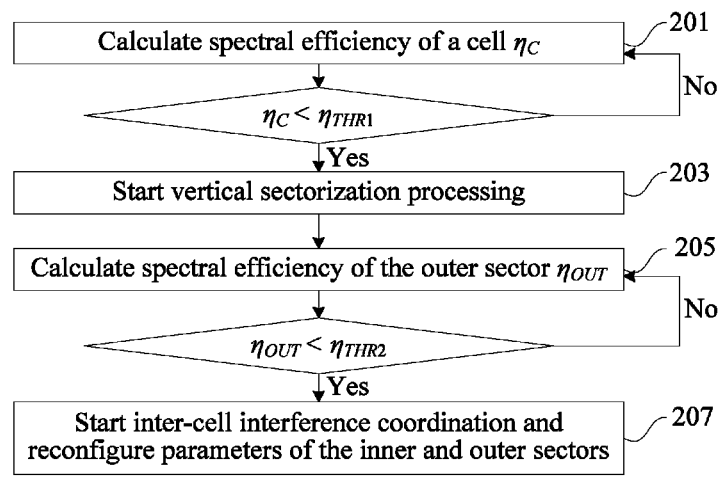
FIG. 2 is a flow chart of another embodiment of a cell coverage and capacity self-optimization method in the present invention.

As shown in FIG. 2, the present invention further provides another embodiment of cell capacity and coverage self-optimization method, and the method of this embodiment includes the following steps.

S201: Calculate spectral efficiency of a cell $\eta_C$,

In specific implementation, the spectral efficiency of the cell is calculated through an adaptive method and according to distribution of services and terminals.

If the spectral efficiency of the cell is not equal to 0 and is less than a first threshold $\eta_{THR1}$, S203: start vertical sectorization processing of the cell to divide the cell into an inner sector and an outer sector, and configure relevant parameters of the inner sector and the outer sector to improve the spectral efficiency of the cell.

If the spectral efficiency of the cell is not less than the first threshold, or the calculated value of the spectral efficiency is zero, the procedure returns to S201.

S205: Calculate spectral efficiency of the outer sector $\eta_{OUT}$.

If the spectral efficiency of the outer sector $\eta_{OUT}$ is not equal to 0 and is less than a second threshold $\eta_{THR2}$, S207: start inter-cell interference coordination to improve the spectral efficiency of the outer sector, and reconfigure the relevant parameters of the inner sector and the outer sector to improve the spectral efficiency of the cell.

If the spectral efficiency of the outer sector is not less than the second threshold, or the calculated value of the spectral efficiency is zero, the procedure returns to S205.

In S201, the spectral efficiency of the cell is calculated according to the distribution of cell services and terminals. The spectral efficiency is determined specifically according to a sum of service rates of cell users and bandwidth allocated to the cell, and a calculation method of the spectral efficiency of the cell $\eta_C$ is calculated according to Formula (1):

$$\eta_C = \frac{1}{W_T} \sum_{i=0}^{N_T-1} R_i \tag{1}$$

where $N_T$ is the number of users served by the cell in a statistics cycle T and $W_T$ is total bandwidth allocated to the cell in the statistics cycle T; $R_i$ is a rate of all services of user i; is a user serial number and is an integer. A calculation method of $R_i$ is calculated according to Formula (2):

$$R_i = \sum_{q=1}^{Q} R_{i,q} = \sum_{q=1}^{Q} W_{i,q} \log_2(1 + SINR_i) \tag{2}$$

$R_{i,q}$ is a rate obtained by a service of service quality type q of cell user i and $W_{i,q}$ is bandwidth allocated to the service of service quality type q of cell user i, and $SINR_i$ is a signal-to-noise ratio of user i.

The spectral efficiency of the outer sector may be obtained in the same manner, and the calculating the spectral efficiency of the outer sector specifically includes: determining the spectral efficiency according to a sum of service rates of outer sector users and bandwidth allocated to the outer sector. A calculation method is shown in Formula (3):

$$\eta_{OUT} = \frac{1}{W_{T,out}} \sum_{i=0}^{N_{T,out}-1} R_i \qquad (3)$$

where $N_{T,out}$ is the number of users served by the cell in a statistics cycle T and $W_{T,out}$ is total bandwidth allocated to the cell in the statistics cycle T.

The spectral efficiency of a cell embodies cell capacity performance, and the spectral efficiency of a cell edge embodies coverage performance. Apparently, spectral efficiency which is a performance index embodies the influence of service load and interference, and optimization of the spectral efficiency of the cell and spectral efficiency of the cell edge embodies optimization of capacity and coverage.

The purpose of the self-optimization method is to optimize the spectral efficiency of the cell $\eta_C$ and the spectral efficiency of the cell edge $\eta_{OUT}$ with certain system bandwidth $W_C$ and certain power $P_C$, which is shown in Formula (4):

$$\max(w_C \eta_C + w_{OUT} \eta_{OUT}) \text{ st. } W_C \le W, P_C \le P \qquad (4)$$

where $w_C$ is the weight coefficient of the spectral efficiency of the cell $\eta_C$ and $w_{OUT}$ is the weight coefficient of the spectral efficiency of the cell edge $\eta_{OUT}$.

In S203, the vertical sectorization processing of the cell is performed, to divide the cell into the inner sector and the outer sector and configure the relevant parameters of the inner sector and the outer sector, so as to improve the spectral efficiency of the cell.

Figure 3:
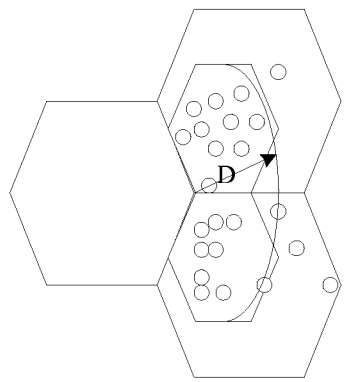
FIG. 3 is a terminal distribution diagram for embodying the density distance of terminals near a base station in an embodiment of the present invention.

For configuration of an antenna downtilt, an antenna downtilt of the inner sector and an antenna downtilt of the outer sector are configured according to a density distance of terminals near a base station, an antenna height, a vertical half power angle, and an antenna downtilt that is obtained before start of the vertical sectorization. The density distance of terminals near the base station indicates that distances from a large proportion of terminals to the base station are within the density distance of terminals near the base station. As shown in FIG. 3, D indicates the density distance of terminals near the base station, and in a specific embodiment, a value of a downtilt is greater than 50%. Setting of the antenna downtilt of the inner sector depends on the distribution of user terminals in the cell, and a region corresponding to the downtilt should cover a dense region of user terminals near the base station as much as possible. A process of configuring an antenna downtilt is as follows.

First, a ratio between the antenna downtilt of the inner sector and the antenna downtilt of the outer sector after start of the vertical sectorization of the cell is calculated, and a calculation method is shown in Formula (5):

$$\lambda DT = \alpha = \arctan(H/D) + \beta/2\lambda = [\arctan(H/D) + \beta/2]/DT, \qquad (5)$$

where $\lambda$ is the ratio between the antenna downtilt of the inner sector and the antenna downtilt of the outer sector after start of the vertical sectorization of the cell, D is the density distance of terminals near the base station, H is the antenna height, $\beta$ is the vertical half power angle, and DT is the antenna downtilt before start of a vertical sectorization function of the cell.

Then, the antenna downtilt of the inner sector and the antenna downtilt of the outer sector after start of the vertical sectorization function of the cell are calculated according to Formula (6):

$$DT_{in} = \lambda DT, DT_{out} = DT \qquad (6)$$

$DT_{in}$ is the antenna downtilt of the inner sector after start of the vertical sectorization function of the cell, and $DT_{out}$ is the antenna downtilt of the outer sector after start of the vertical sectorization function of the cell.

When distribution of terminals close to the base station is not dense enough and it is not easy to determine D, the parameter D may be set based on the case that a range covered by the inner sector is half of the range of an original sector, and the calculation method is shown in Formula (7):

$$D = \frac{\sqrt{2} R}{2} \qquad (7)$$

where R is a radius of the sector.

In the vertical sectorization processing of the cell, power of the inner sector and power of the outer sector are configured according to a ratio between the number of physical resource blocks occupied by inner sector users and the number of physical resource blocks occupied by outer sector users, and cell power that is obtained before start of the vertical sectorization. The power configuration process of the inner sector and the outer sector includes:

first, calculating a ratio between power of the inner sector and power of the outer sector after start of the vertical sectorization function according to Formula (8):

$$\mu = \frac{M_{in}}{M_{out}} \qquad (8)$$

where $\mu$ is the ratio between the power of the inner sector and the power of the outer sector of the cell after start of the vertical sectorization function, $M_{in}$ is the number of physical resource blocks occupied by inner sector users before start of the vertical sectorization function, and $M_{out}$ is the number of physical resource blocks occupied by outer sector users before start of the vertical sectorization function; and then, calculating the power of the inner sector and the power of the outer sector after start of the vertical sectorization function according to Formula (9):

$$P_{in} = \frac{\mu P}{\mu + 1}, P_{out} = \frac{P}{\mu + 1}, \qquad (9)$$

where P is the cell power before start of the vertical sectorization function of the cell, $P_{in}$ is the power of the inner sector after start of the vertical sectorization function, and $P_{out}$ is the power of the outer sector after start of the vertical sectorization function.

The inter-cell interference coordination in S207 specifically includes: configuring a receipt signal reference power value; according to a size of a receipt signal of a user terminal, further dividing the outer sector into a central region and an edge region by using the receipt signal reference power value (RSRP) as a boundary; and increasing bandwidth of the edge region of the current cell, reducing a ratio between power of a central region and power of an edge region of a neighbor cell, or increasing receipt signal reference power of a neighbor cell.

Figure 4:
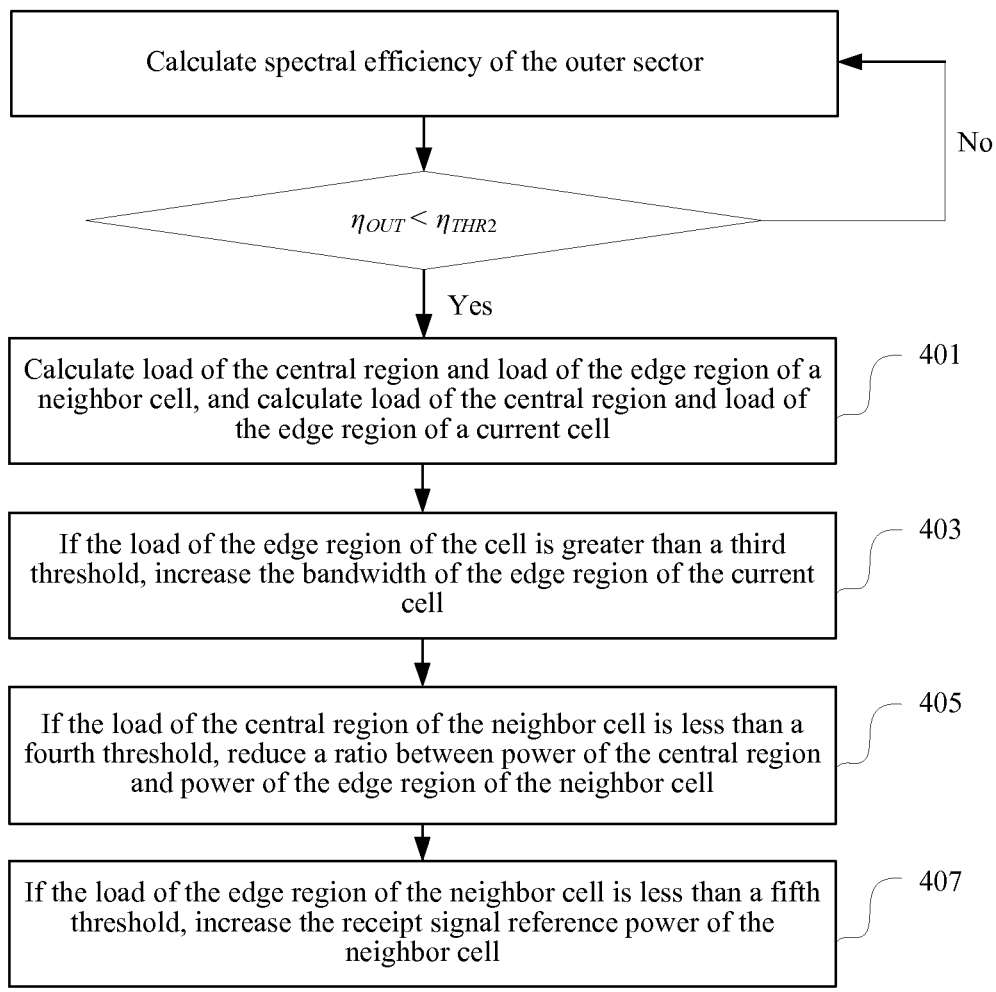
FIG. 4 is a flow chart of inter-cell interference coordination in an embodiment of the present invention.

A flow chart of the inter-cell interference coordination is shown in FIG. 4, and if the spectral efficiency of the outer sector is less than the second threshold, the process includes the following steps.

S401: Calculate load of the central region and load of the edge region of the current cell, and calculate load of the central region and load of the edge region of the neighbor cell.

S402: If the load of the edge region of the cell is greater than a third threshold, increase the bandwidth of the edge region of the current cell.

S403: If the load of the central region of the neighbor cell is less than a fourth threshold, reduce the ratio between the power of the central region and the power of the edge region of the neighbor cell.

S404: If user service load of the edge region of the neighbor cell is less than a fifth threshold, increase the receipt signal reference power of the neighbor cell.

In a specific embodiment, the third threshold is 0.6, the fourth threshold is 0.6, and the fifth threshold is 0.6. However, the thresholds are not limited to the specific values. The third threshold, the fourth threshold, and the fifth threshold are determined according to network parameters used for estimating network performance, and may have different values in different network applications.

Figure 5:
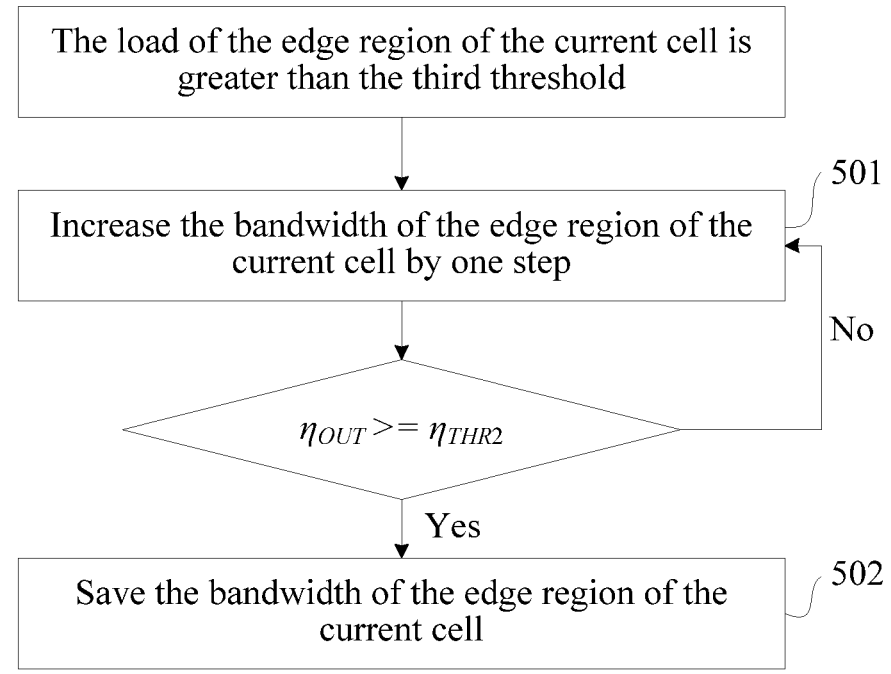
FIG. 5 is a flow chart of adjustment of an ICIC bandwidth parameter in an embodiment of the present invention.

A specific implementation process of S402 is shown in FIG. 5, and the method includes the following steps.

S501: Increase the bandwidth of the edge region of the current cell by one step; and calculate the spectral efficiency of the outer sector.

If the spectral efficiency of the outer sector is greater than the second threshold, S502: save the bandwidth of the edge region of the current cell.

If the spectral efficiency of the outer sector is less than the second threshold, the procedure returns to S501.

In a specific embodiment, a value of the step is 0.1.

If the number of edge region users of the outer sector of the cell increases, the interference on the neighbor cell grows. By increasing bandwidth used by the edge region of the current cell, the throughput of the edge region may be increased, and at the same time, interference on the neighbor cell is reduced.

Figure 6:
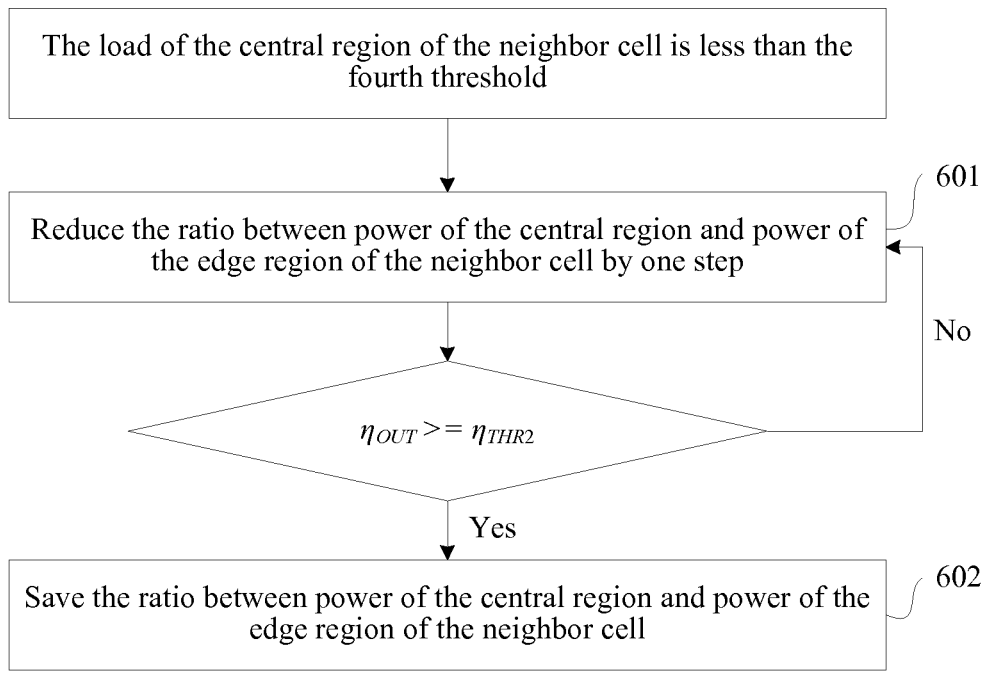
FIG. 6 is a flow chart of adjustment of an ICIC power ratio parameter in an embodiment of the present invention.

A specific implementation process of S403 is shown in FIG. 6, and the method includes the following steps.

S601: Reduce the ratio between the power of the central region and the power of the edge region of the neighbor cell by one step; and calculate the spectral efficiency of the outer sector.

If the spectral efficiency of the outer sector is greater than the second threshold, S602: save the ratio between the power of the central region and the power of the edge region of the neighbor cell.

If the spectral efficiency of the outer sector is less than the second threshold, the procedure returns to S601.

In a specific embodiment, a value of the step is 0.1.

If the load of the central region of the neighbor cell is small, by reducing an ICIC ratio between the power of the central region and the power of the edge region of the neighbor cell, interference from the neighbor cell (co-frequency interference from the central region of the neighbor cell) may be reduced, and a signal-to-noise ratio of the current cell may be increased, thereby improving the spectral efficiency of the outer sector, that is, the spectral efficiency of the cell edge.

Figure 7:
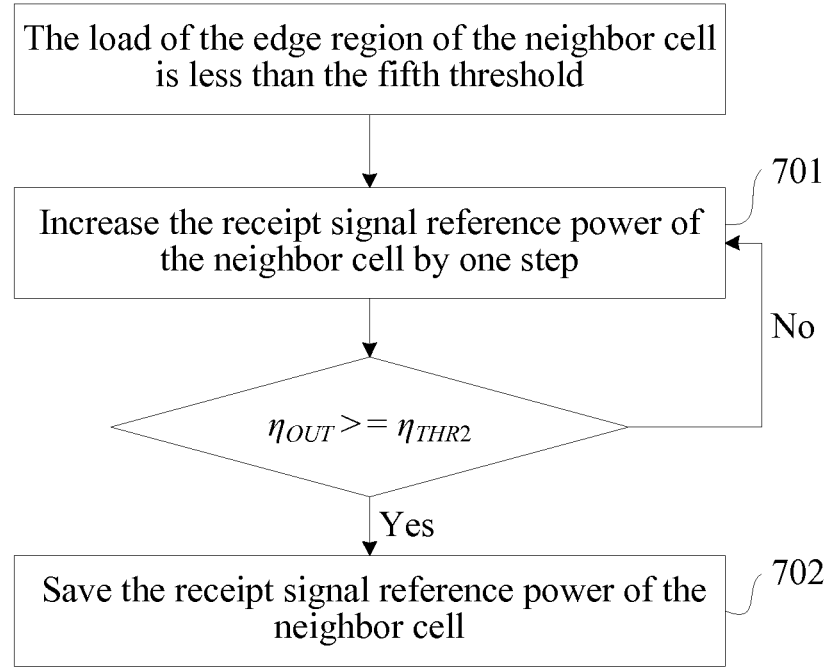
FIG. 7 is a flow chart of adjustment of an ICIC receipt signal reference power parameter in an embodiment of the present invention.

A specific implementation process of S404 is shown in FIG. 7, and the method includes the following steps.

S701: Increase the receipt signal reference power of the neighbor cell by one step; and calculate the spectral efficiency of the outer sector.

If the spectral efficiency of the outer sector is greater than the second threshold, S702: save the receipt signal reference power of the neighbor cell.

If the spectral efficiency of the outer sector is less than the second threshold, the procedure returns to S701.

In a specific embodiment, a value of the step is 1 dB.

Increase of the ICIC RSRP of the neighbor cell may cause the decrease of spectral efficiency of the neighbor cell. However, when user service load of the edge region of the neighbor cell is not heavy, such influence basically can be neglected. With this method, more users of the neighbor cell can use the bandwidth of the edge region, thereby reducing interference from the neighbor cell (co-frequency interference of the central region of the neighbor cell).

During the adjustment of ICIC parameters, the adjustment of a ratio between bandwidth of the central region and bandwidth of the edge region of the current cell, the adjustment of the ICIC RSRP of the neighbor cell, or the adjustment of the ratio between the power of the central region and the power of the edge region may be performed separately, or any two of the adjustments are performed at the same time, or any three of adjustments are performed at the same time.

According to the Shannon's Theorems, to increase bandwidth or improve a signal-to-noise ratio can achieve the effect of increasing system capacity. However, in a practical system, system bandwidth and a signal-to-noise ratio cannot be increased indefinitely, and with certain system bandwidth and a certain signal-to-noise ratio, the capacity may be increased by reusing bandwidth and reducing interference. The vertical sectorization and inter-cell interference coordination implement the increase of the capacity by reusing the bandwidth and reducing interference.

Through the inter-cell interference coordination, spectral efficiency of an outer sector can be improved, and to ensure that spectral efficiency of an entire cell is not affected when the ICIC is started, a vertical sectorization function needs to be started when the ICIC is started. With the vertical sectorization function, an antenna downtilt is reconfigured according to the change of a density distance of terminals near the base station, and meanwhile, power of an inner sector and power of an outer sector are reconfigured according to a service ratio between the region covered by the inner sector and the region covered by the outer sector.

When the spectral efficiency of the outer sector is less than the second threshold, it indicates that interference is severe. The interference is from the inner sector and the neighbor cell, and the inter-cell interference coordination is started to improve the spectral efficiency of the outer sector. The decrease of the spectral efficiency of the cell is usually caused by increased cell load and interference. Especially, when a large number of users are located at a cell edge, the spectral efficiency of the cell decreases, and the spectral efficiency of the cell edge decreases. At this time, a cell self-optimization device starts a vertical sectorization function and an inter-cell interference coordination function at the same time, that is, the interference coordination function cannot be used alone, but can only be used together with the vertical sectorization function. If a large number of users are distributed in a cell center only, the cell self-optimization device only uses the vertical sectorization function, that is, the vertical sectorization function can be used alone.

Since power of an outer sector has a significant influence on performance of an interference coordination function module, after the foregoing steps, the method further includes: further reducing a ratio between power of an inner sector and power of an outer sector, so as to increase the power of the outer sector, which is calculated according to Formula (10) and Formula (11):

$$\mu' = \omega\mu = \omega\xi, \omega < 1, \text{(for example, } w = 5/6) \quad (11)$$

$$P_{out} = \frac{P}{\mu' + 1}.$$

Figure 8:
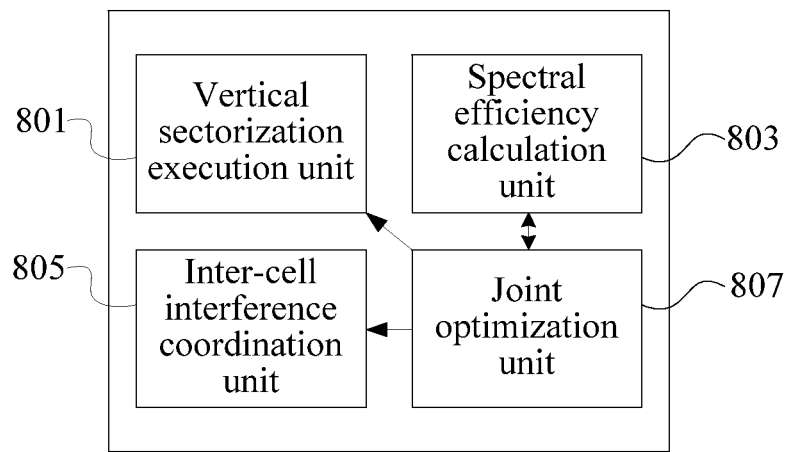
FIG. 8 is a schematic structural diagram of an embodiment of a cell coverage and capacity self-optimization device in the present invention.

The present invention provides an embodiment of a cell capacity and coverage self-optimization device. As shown in FIG. 8, the device includes: a vertical sectorization execution unit 801, configured to start vertical sectorization processing to divide a cell into an inner sector and an outer sector, and configure relevant parameters of the inner sector and the outer sector to improve spectral efficiency of the cell; a spectral efficiency calculation unit 803, configured to calculate spectral efficiency of the cell or the outer sector; an inter-cell interference coordination unit 805, configured to start inter-cell interference coordination to improve the spectral efficiency of the outer sector; and a joint optimization unit 807, configured to invoke the spectral efficiency calculation unit to calculate the spectral efficiency of the cell, when the spectral efficiency of the cell is less than a first threshold, invoke the vertical sectorization execution unit to divide the cell into an inner sector and an outer sector and configure relevant parameters of the inner sector and the outer sector to improve the spectral efficiency of the cell, and when the spectral efficiency of the outer sector is less than a second threshold, invoke the inter-cell interference coordination unit to start inter-cell interference coordination to improve the spectral efficiency of the outer sector, and reconfigure the relevant parameters of the inner sector and the outer sector to improve the spectral efficiency of the cell.

The spectral efficiency calculation unit is configured to calculate the spectral efficiency according to a sum of service rates of cell users and bandwidth allocated to the cell, and is specifically configured to calculate the spectral efficiency according to Formula (12):

$$\eta_C = \frac{1}{W_T} \sum_{i=0}^{N_T-1} R_i, \quad (12)$$

where $\eta_C$ is the spectral efficiency, $N_T$ is the number of users served by the cell in a statistics cycle T; $W_T$ is total bandwidth allocated to the cell in the statistics cycle T, $R_i$ is a rate of all services of user i; i is a user serial number and is an integer.

The spectral efficiency calculation unit is further configured to calculate the spectral efficiency of the outer sector according to a sum of service rates of outer sector users and bandwidth allocated to the outer sector.

The vertical sectorization execution unit is configured to configure power of the inner sector and power of the outer sector according to a ratio between the number of physical resource blocks occupied by inner sector users and the number of physical resource blocks occupied by outer sector users, and cell power that is obtained before start of the vertical sectorization. Specifically:

the vertical sectorization execution unit is configured to configure an antenna downtilt of the inner sector and an antenna downtilt of the outer sector according to a density distance of terminals near a base station, an antenna height, a vertical half power angle, and an antenna downtilt that is obtained before start of the vertical sectorization, where the density distance of terminals near the base station indicates that distances from a large proportion of the terminals to the base station are within the density distance of terminals near the base station, and the large proportion is greater than 50%. The vertical sectorization execution unit is specifically configured to:

first, calculate a ratio between the antenna downtilt of the cell inner sector and the antenna downtilt of the outer sector of the cell after start of the vertical sectorization according to Formula (13):

$$\lambda = [\arctan(H/D) + \beta/2]/DT \quad (13)$$

where $\lambda$ is the ratio between the antenna downtilt of the inner sector and the antenna downtilt of the outer sector of the cell, D is the density distance of terminals near the base station, H is the antenna height, $\beta$ is the vertical half power angle, and DT is the antenna downtilt before start of a vertical sectorization function of the cell;

then, calculate the antenna downtilt of the inner sector and the antenna downtilt of the outer sector after start of the vertical sectorization function of the cell according to Formula (14):

$$DT_{in} = \lambda DT, DT_{out} = DT \quad (14)$$

where $DT_{in}$ is the antenna downtilt of the inner sector after start of the vertical sectorization function of the cell, and $DT_{out}$ is the antenna downtilt of the outer sector after start of the vertical sectorization function of the cell;

first, calculate a ratio between power of the inner sector and power of the outer sector after start of the vertical sectorization function according to Formula (15):

$$\mu = \frac{M_{in}}{M_{out}} \quad (15)$$

where $\mu$ is the ratio between the power of the inner sector and the power of the outer sector of the cell after start of the vertical sectorization function, $M_{in}$ is the number of physical resource blocks occupied by inner sector users before start of the vertical sectorization function, and $M_{out}$ is the number of physical resource blocks occupied by outer sector users before start of the vertical sectorization function; and then, calculate the power of the inner sector and the power of the outer sector after start of the vertical sectorization function according to Formula (16):

$$P_{in} = \frac{\mu P}{\mu + 1}, P_{out} = \frac{P}{\mu + 1} \quad (16)$$

where P is the cell power before start of the vertical sectorization function of the cell, $P_{in}$ is the power of the inner sector after start of the vertical sectorization function, and $P_{out}$ is the power of the outer sector after start of the vertical sectorization function.

The inter-cell interference coordination unit is configured to: configure a receipt signal reference power value; according to a size of a receipt signal of a user terminal, further divide the outer sector into a central region and an edge region by using the receipt signal reference power as a boundary; and increase bandwidth of an edge region of a current cell, reduce a ratio between power of a central region and power of an edge region of a neighbor cell, or increase receipt signal reference power of a neighbor cell. The inter-cell interference coordination unit is specifically configured to:

if load of the edge region of the cell is greater than a third threshold, increase bandwidth of the edge region of the current cell;

if load of the central region of the neighbor cell is less than a fourth threshold, reduce the ratio between power of the central region and power of the edge region of the neighbor cell; or if user service load of the edge region of the neighbor cell is less than a fifth threshold, increase the receipt signal reference power of the neighbor cell.

The inter-cell interference coordination unit is further configured to reduce a ratio between power of the inner sector and power of the outer sector and increase the power of the outer sector.

Figure 9:
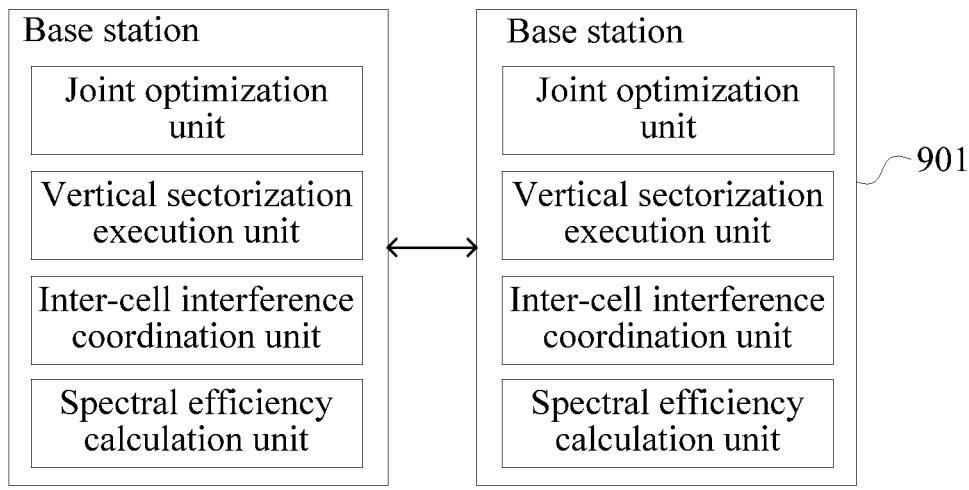
FIG. 9 is a schematic structural diagram of an embodiment of a cell coverage and capacity self-optimization management system in the present invention.

The present invention provides an embodiment of a management system with a cell capacity and coverage self-optimization function, as shown in FIG. 9. The management system includes at least one base station, as shown by 901. The base station includes: a spectral efficiency calculation unit, configured to calculate spectral efficiency of a cell corresponding to the base station; a vertical sectorization execution unit, configured to start vertical sectorization processing to divide the cell corresponding to the base station into an inner sector and an outer sector, and configure relevant parameters of the inner sector and the outer sector to improve the spectral efficiency of the cell corresponding to the base station, where the spectral efficiency calculation unit is further configured to calculate spectral efficiency of the outer sector; an inter-cell interference coordination unit, configured to start inter-cell interference coordination of the cell corresponding to the base station to improve the spectral efficiency of the outer sector; and a joint optimization unit, configured to invoke the spectral efficiency calculation unit to calculate the spectral efficiency of the cell corresponding to the base station, when the spectral efficiency of the cell corresponding to the base station is less than a first threshold, invoke the vertical sectorization execution unit to divide the cell corresponding to the base station into an inner sector and an outer sector, and configure relevant parameters of the inner sector and the outer sector to improve the spectral efficiency of the cell corresponding to the base station, and when spectral efficiency of the outer sector is less than a second threshold, invoke, according to information of interaction with other neighbor base stations, the inter-cell interference coordination unit of the base station to start inter-cell interference coordination to improve the spectral efficiency of the outer sector, and reconfigure the relevant parameters of the inner sector and the outer sector to improve the spectral efficiency of the cell corresponding to the base station.

Figure 10:
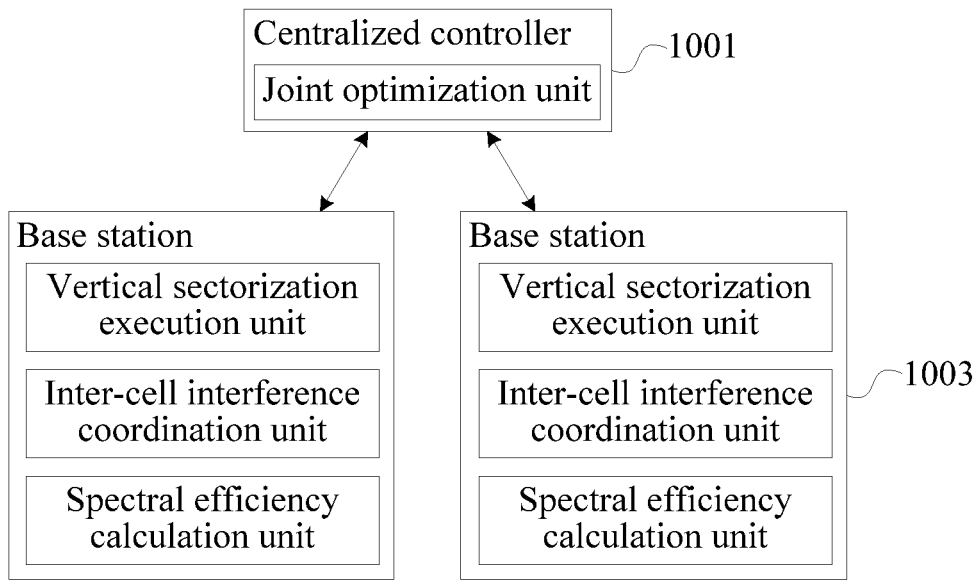
FIG. 10 is a schematic structural diagram of another embodiment of a cell coverage and capacity self-optimization management system in the present invention.

The present invention provides another embodiment of a management system with a cell capacity and coverage self-optimization function, as shown in FIG. 10. The management system includes at least one base station, as shown by 1003. The base station includes: a spectral efficiency calculation unit, configured to calculate spectral efficiency of a cell corresponding to the base station; a vertical sectorization execution unit, configured to start vertical sectorization processing to divide the cell corresponding to the base station into an inner sector and an outer sector, and configure relevant parameters of the inner sector and the outer sector to improve the spectral efficiency of the cell corresponding to the base station, where the spectral efficiency calculation unit is further configured to calculate spectral efficiency of the outer sector; and an inter-cell interference coordination unit, configured to start inter-cell interference coordination to improve the spectral efficiency of the outer sector. The management system further includes a centralized controller, where the centralized controller may be implemented by a joint optimization unit, as shown by 1001. The centralized controller is configured to: invoke the spectral efficiency calculation unit of each base station controlled by the centralized controller to calculate spectral efficiency of a cell corresponding to each base station; if spectral efficiency of a cell corresponding to a base station is less than a first threshold, invoke the vertical sectorization execution unit of the base station to divide the cell corresponding to the base station into an inner sector and an outer sector, and configure relevant parameters of the inner sector and the outer sector to improve the spectral efficiency of the cell corresponding to the base station, and when spectral efficiency of the outer sector is less than a second threshold, invoke, according to information of interaction with the base stations controlled by the centralized controller, the inter-cell interference coordination unit of the base station to start inter-cell interference coordination to improve the spectral efficiency of the outer sector, and reconfigure the relevant parameters of the inner sector and the outer sector to improve the spectral efficiency of the cell corresponding to the base station.

Figure 11:
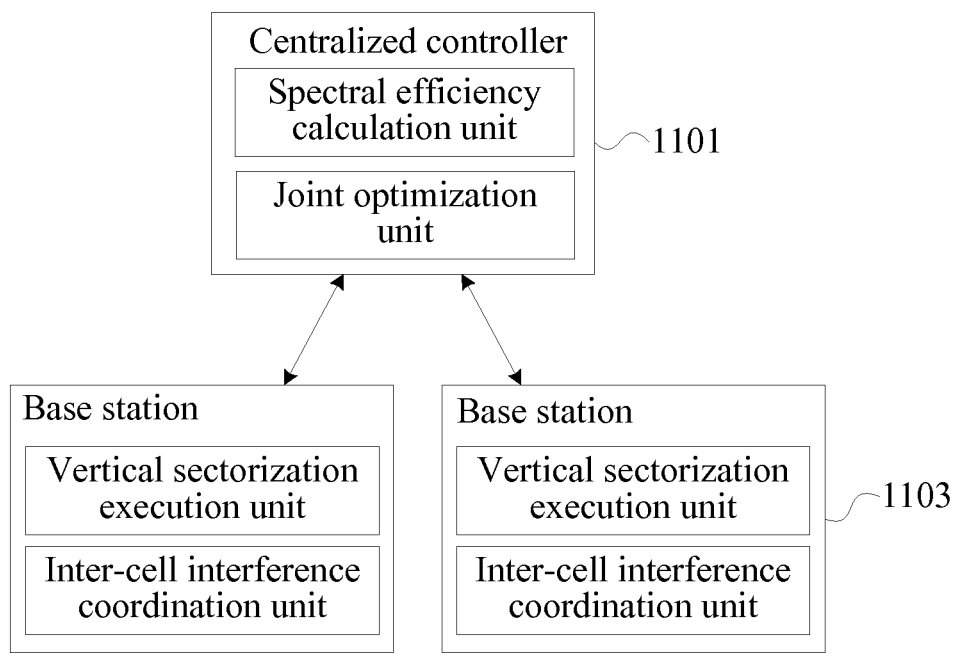
FIG. 11 is a schematic structural diagram of yet another embodiment of a cell coverage and capacity self-optimization management system in the present invention.

The present invention further provides yet another embodiment of a management system with a cell capacity and coverage self-optimization function, as shown in FIG. 11. The management system includes at least one base station, as shown by 1103. The base station includes: a vertical sectorization execution unit, configured to start vertical sectorization processing to divide a cell corresponding to the base station into an inner sector and an outer sector, and configure relevant parameters of the inner sector and the outer sector to improve spectral efficiency of the cell corresponding to the base station; and an inter-cell interference coordination unit, configured to start inter-cell interference coordination to improve spectral efficiency of the outer sector. The management system further includes a centralized controller, as shown by 1101. The centralized controller includes: a spectral efficiency calculation unit, configured to calculate spectral efficiency of a cell or an outer sector corresponding to each base station managed by the centralized controller; and a joint optimization unit, configured to invoke the spectral efficiency calculation unit to calculate the spectral efficiency of the cell corresponding to each base station managed by the centralized controller, if spectral efficiency of a cell corresponding to a base station is less than a first threshold, invoke the vertical sectorization execution unit of the base station to divide the cell into an inner sector and an outer sector and configure relevant parameters of the inner sector and the outer sector to improve the spectral efficiency of the cell, and when the spectral efficiency of the outer sector corresponding to the base station is less than a second threshold, invoke, according to information of interaction with the base stations, the inter-cell interference coordination unit of the base station to start inter-cell interference coordination to improve the spectral efficiency of the outer sector corresponding to the base station, and reconfigure the relevant parameters of the inner sector and the outer sector to improve the spectral efficiency of the cell corresponding to the base station.

What is claimed is:

1. A cell coverage and capacity self-optimization method in a mobile communication network, comprising:
calculating spectral efficiency of a cell;
if the spectral efficiency of the cell is less than a first threshold, start vertical sectorization processing of the cell to divide the cell into an inner sector and an outer sector;
configuring relevant parameters of the inner sector and the outer sector to improve the spectral efficiency of the cell;
calculating spectral efficiency of the outer sector; and
if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell;
wherein the calculating the spectral efficiency of the cell comprises:
determining the spectral efficiency according to a sum of service rates of cell users and bandwidth allocated to the cell; and
the calculating the spectral efficiency of the outer sector comprises:
determining the spectral efficiency according to a sum of service rates of outer sector users and bandwidth allocated to the outer sector;
wherein the determining the spectral efficiency according to the sum of the service rates of the cell users and the bandwidth allocated to the cell comprises: calculating the spectral efficiency according to the following formula:

$$\eta_C = \frac{1}{W_T} \sum_{i=0}^{N_T-1} R_i,$$

wherein $\eta_C$ is the spectral efficiency, $N_T$ is the number of users served by the cell in a statistics cycle T; $W_T$ is total bandwidth allocated to the cell in the statistics cycle T, $R_i$ is a rate of all services of user i; i is a user serial number and is an integer.

2. A cell coverage and capacity self-optimization method in a mobile communication network, comprising:
calculating spectral efficiency of a cell;
if the spectral efficiency of the cell is less than a first threshold, start vertical sectorization processing of the cell to divide the cell into an inner sector and an outer sector;
configuring relevant parameters of the inner sector and the outer sector to improve the spectral efficiency of the cell;
calculating spectral efficiency of the outer sector; and
if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell;
wherein configuring relevant parameters of the inner sector and the outer sector to improve the spectral efficiency of the cell comprises:
configuring an antenna downtilt of the inner sector and an antenna downtilt of the outer sector according to a density distance of terminals near a base station, an antenna height, a vertical half power angle; and
an antenna downtilt that is obtained before start of the vertical sectorization, the density distance of terminals near the base station indicates that distances from a large proportion of terminals to the base station are within the density distance of terminals near the base station, and the large proportion is greater than 50%.

3. The method according to claim 2, wherein the configuring the antenna downtilt of the inner sector and the antenna downtilt of the outer sector according to the density distance of terminals near the base station, the antenna height, the vertical half power angle and the antenna downtilt that is obtained before start of the vertical sectorization comprises:
first calculating a ratio between the antenna downtilt of the inner sector and the antenna downtilt of the outer sector after start of the vertical sectorization of the cell, wherein a calculation formula is: $\lambda=[\arctan(H/D)+\beta/2]/DT$
wherein $\lambda$ is the ratio between the antenna downtilt of the inner sector and the antenna downtilt of the outer sector after start of the vertical sectorization of the cell, D is the density distance of terminals near the base station, H is the antenna height, $\beta$ is the vertical half power angle, and DT is the antenna downtilt before start of a vertical sectorization function of the cell; and
then calculating the antenna downtilt of the inner sector and the antenna downtilt of the outer sector after start of the vertical sectorization function of the cell according to the following formula:

$$DT_{in}=\lambda DT, DT_{out}=DT,$$

$DT_{in}$ is the antenna downtilt of the inner sector after start of the vertical sectorization function of the cell, and $DT_{out}$ is the antenna downtilt of the outer sector after start of the vertical sectorization function of the cell.

4. A cell coverage and capacity self-optimization method in a mobile communication network, comprising:
calculating spectral efficiency of a cell;
if the spectral efficiency of the cell is less than a first threshold, start vertical sectorization processing of the cell to divide the cell into an inner sector and an outer sector;
configuring relevant parameters of the inner sector and the outer sector to improve the spectral efficiency of the cell;
calculating spectral efficiency of the outer sector; and
if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell;
wherein configuring relevant parameters of the inner sector and the outer sector to improve the spectral efficiency of the cell comprises:
configuring power of the inner sector and the outer sector according to a ratio between the number of physical resource blocks occupied by inner sector users and the number of physical resource blocks occupied by outer sector users and cell power that is obtained before start of the vertical sectorization;
wherein the configuring the power of the inner sector and the outer sector according to the ratio between the number of physical resource blocks occupied by the inner sector users and the number of physical resource blocks occupied by the outer sector users and the cell power that is obtained before start of the vertical sectorization comprises:

first calculating a ratio between power of the inner sector and power of the outer sector after start of the vertical sectorization function according to the following formula:

$$\mu = \frac{M_{in}}{M_{out}},$$

wherein μ is the ratio between the power of the inner sector and the power of the outer sector of the cell after start of the vertical sectorization function, $M_{in}$ is the number of physical resource blocks occupied by the inner sector users before start of the vertical sectorization function, and $M_{out}$ is the number of physical resource blocks occupied by the outer sector users before start of the vertical sectorization function; and then calculating the power of the inner sector and the power of the outer sector after start of the vertical sectorization function according to the following formula:

$$P_{in} = \frac{\mu P}{\mu + 1}, P_{out} = \frac{P}{\mu + 1},$$

wherein P is the cell power before start of the vertical sectorization function of the cell, $P_{in}$ is the power of the inner sector after start of the vertical sectorization function, and $P_{out}$ is the power of the outer sector after start of the vertical sectorization function.

5. A cell coverage and capacity self-optimization method in a mobile communication network, comprising:
calculating spectral efficiency of a cell;
if the spectral efficiency of the cell is less than a first threshold, start vertical sectorization processing of the cell to divide the cell into an inner sector and an outer sector;
configuring relevant parameters of the inner sector and the outer sector to improve the spectral efficiency of the cell;
calculating spectral efficiency of the outer sector; and
if the spectral efficiency of the outer sector is less than a second threshold, starting inter-cell interference coordination to improve the spectral efficiency of the outer sector, and reconfiguring the relevant parameters of the inner sector and the outer sector to improve the spectral efficiency of the cell;
wherein the starting the inter-cell interference coordination comprises:
configuring a receipt signal reference power value; according to a size of a receipt signal of a user terminal, further dividing the outer sector into a central region and an edge region by using the receipt signal reference power value as a boundary; and
increasing bandwidth of an edge region of a current cell, reducing a ratio between power of a central region and power of an edge region of a neighbor cell, or increasing receipt signal reference power of a neighbor cell.

6. The method according to claim 5, wherein the increasing the bandwidth of the edge region of the current cell comprises: if load of the edge region of the cell is greater than a third threshold, increasing the bandwidth of the edge region of the current cell.

7. The method according to claim 5, wherein the reducing the ratio between the power of the central region and the power of the edge region of the neighbor cell comprises:
if load of the central region of the neighbor cell is less than a fourth threshold, reducing the ratio between the power of the central region and the power of the edge region of the neighbor cell.

8. The method according to claim 5, wherein the increasing the receipt signal reference power of the neighbor cell comprises:
if user service load of the edge region of the neighbor cell is less than a fifth threshold, increasing the receipt signal reference power of the neighbor cell.

9. A cell capacity and coverage self-optimization device, comprising:
a spectral efficiency calculation unit, configured to calculate spectral efficiency of a cell;
a vertical sectorization execution unit, configured to start vertical sectorization processing to divide the cell into an inner sector and an outer sector, and configure relevant parameters of the inner sector and the outer sector to improve the spectral efficiency of the cell,
wherein the spectral efficiency calculation unit is further configured to calculate spectral efficiency of the outer sector; and the device further comprising:
an inter-cell interference coordination unit, configured to start inter-cell interference coordination to improve the spectral efficiency of the outer sector; and
a joint optimization unit, configured to invoke the spectral efficiency calculation unit to calculate the spectral efficiency of the cell, when the spectral efficiency of the cell is less than a first threshold, invoke the vertical sectorization execution unit to divide the cell into an inner sector and an outer sector and configure relevant parameters of the inner sector and the outer sector to improve the spectral efficiency of the cell, and when spectral efficiency of the outer sector is less than a second threshold, invoke the inter-cell interference coordination unit to start inter-cell interference coordination to improve the spectral efficiency of the outer sector, and reconfigure the relevant parameters of the inner sector and the outer sector to improve the spectral efficiency of the cell;
wherein the spectral efficiency calculation unit is configured to calculate the spectral efficiency of the cell according to a sum of service rates of cell users and bandwidth allocated to the cell;
wherein the spectral efficiency calculation unit is configured to calculate the spectral efficiency of the cell according to the sum of service rates of the users and the bandwidth allocated to the cell, and is configured to calculate the spectral efficiency of the cell according to the following formula:

$$\eta_C = \frac{1}{W_T} \sum_{i=0}^{N_T-1} R_i,$$

wherein $\eta_C$ is the spectral efficiency, $N_T$ is the number of users served by the cell in a statistics cycle T; $W_T$ is total bandwidth allocated to the cell in the statistics cycle T, $R_i$ is a rate of all services of user i; i is a user serial number and is an integer.

10. A cell capacity and coverage self-optimization device, comprising:
a spectral efficiency calculation unit, configured to calculate spectral efficiency of a cell;
a vertical sectorization execution unit, configured to start vertical sectorization processing to divide the cell into an inner sector and an outer sector, and configure relevant parameters of the inner sector and the outer sector to improve the spectral efficiency of the cell, wherein the spectral efficiency calculation unit is further configured to calculate spectral efficiency of the outer sector; and the device further comprising:

an inter-cell interference coordination unit, configured to start inter-cell interference coordination to improve the spectral efficiency of the outer sector; and a joint optimization unit, configured to invoke the spectral efficiency calculation unit to calculate the spectral efficiency of the cell, when the spectral efficiency of the cell is less than a first threshold, invoke the vertical sectorization execution unit to divide the cell into an inner sector and an outer sector and configure relevant parameters of the inner sector and the outer sector to improve the spectral efficiency of the cell, and when spectral efficiency of the outer sector is less than a second threshold, invoke the inter-cell interference coordination unit to start inter-cell interference coordination to improve the spectral efficiency of the outer sector, and reconfigure the relevant parameters of the inner sector and the outer sector to improve the spectral efficiency of the cell;

wherein the vertical sectorization execution unit is configured to configure an antenna downtilt of the inner sector and an antenna downtilt of the outer sector according to a density distance of terminals near a base station, an antenna height, a vertical half power angle and an antenna downtilt that is obtained before start of the vertical sectorization, the density distance of terminals near the base station indicates that distances from a large proportion of the terminals to the base station are within the density distance of terminals near the base station, and the large proportion is greater than 50%.

11. The device according to claim 10, wherein the vertical sectorization execution unit is configured to:

first calculate a ratio between the antenna downtilt of the inner sector and the antenna downtilt of the outer sector after start of the vertical sectorization according to the following formula:

$\lambda = [\arctan(H/D) + \beta/2]/DT$, wherein $\lambda$ is the ratio between the antenna downtilt of the inner sector and the antenna downtilt of the outer sector of the cell, D is the density distance of terminals near the base station, H is the antenna height, $\beta$ is the vertical half power angle, and DT is the antenna downtilt before start of a vertical sectorization function of the cell; and then, calculate the antenna downtilt of the inner sector and the antenna downtilt of the outer sector after start of the vertical sectorization function of the cell according to the following formula:

$DT_{in} = \lambda ADT$, $DT_{out} = DT$, wherein $DT_{in}$ is the antenna downtilt of the inner sector after start of the vertical sectorization function of the cell, and $DT_{out}$ is the antenna downtilt of the outer sector after start of the vertical sectorization function of the cell.

12. A cell capacity and coverage self-optimization device, comprising:

a spectral efficiency calculation unit, configured to calculate spectral efficiency of a cell;

a vertical sectorization execution unit, configured to start vertical sectorization processing to divide the cell into an inner sector and an outer sector, and configure relevant parameters of the inner sector and the outer sector to improve the spectral efficiency of the cell, wherein the spectral efficiency calculation unit is further configured to calculate spectral efficiency of the outer sector; and the device further comprising:

an inter-cell interference coordination unit, configured to start inter-cell interference coordination to improve the spectral efficiency of the outer sector; and a joint optimization unit, configured to invoke the spectral efficiency calculation unit to calculate the spectral efficiency of the cell, when the spectral efficiency of the cell is less than a first threshold, invoke the vertical sectorization execution unit to divide the cell into an inner sector and an outer sector and configure relevant parameters of the inner sector and the outer sector to improve the spectral efficiency of the cell, and when spectral efficiency of the outer sector is less than a second threshold, invoke the inter-cell interference coordination unit to start inter-cell interference coordination to improve the spectral efficiency of the outer sector, and reconfigure the relevant parameters of the inner sector and the outer sector to improve the spectral efficiency of the cell;

wherein the spectral efficiency calculation unit is configured to calculate the spectral efficiency of the cell according to a sum of service rates of cell users and bandwidth allocated to the cell;

wherein the inter-cell interference coordination unit is configured to configure a receipt signal reference power value; according to a size of a receipt signal of a user terminal, further divide the outer sector into a central region and an edge region by using the receipt signal reference power value as a boundary; and increase bandwidth of an edge region of a current cell, reduce a ratio between power of a central region and power of an edge region of a neighbor cell, or increase receipt signal reference power of a neighbor cell.

* * * * *